US012237131B2

(12) United States Patent
Taiocchi et al.

(10) Patent No.: US 12,237,131 B2
(45) Date of Patent: Feb. 25, 2025

(54) DEVICE FOR DOOR AND PHASE SEGREGATION IN MOLDED CASE CIRCUIT BREAKERS

(71) Applicant: ABB S.p.A., Milan (IT)

(72) Inventors: Oscar Taiocchi, Bergamo (IT); Michele Ferrari, Bergamo (IT)

(73) Assignee: ABB S.p.A., Milan (IT)

( * ) Notice: Subject to any disclaimer, the term of this patent is extended or adjusted under 35 U.S.C. 154(b) by 297 days.

(21) Appl. No.: 16/983,021

(22) Filed: Aug. 3, 2020

(65) Prior Publication Data

US 2021/0035762 A1 Feb. 4, 2021

(30) Foreign Application Priority Data

Aug. 2, 2019 (EP) .................................... 19189753

(51) Int. Cl.
*H01H 71/12* (2006.01)
*H01H 71/00* (2006.01)
(Continued)

(52) U.S. Cl.
CPC .......... *H01H 71/123* (2013.01); *H01H 71/74* (2013.01); *H01H 77/00* (2013.01); *H01H 2071/006* (2013.01)

(58) Field of Classification Search
CPC .... H01H 71/123; H01H 71/74; H01H 71/025; H01H 71/08; H01H 71/02; H01H 77/00;
(Continued)

(56) References Cited

U.S. PATENT DOCUMENTS

| | | | | |
|---|---|---|---|---|
| 4,620,076 A * | 10/1986 | Mrenna | ................ | H01H 9/0264 200/305 |
| 6,172,586 B1 * | 1/2001 | Ferree | .................... | H01H 71/08 439/810 |

(Continued)

FOREIGN PATENT DOCUMENTS

| | | |
|---|---|---|
| CN | 101176242 A | 5/2008 |
| CN | 104025229 A | 9/2014 |

(Continued)

OTHER PUBLICATIONS

European Patent Office, Extended Search Report issued in corresponding Application No. 19189753.7, mailed Jan. 31, 2020, 6 pp.

(Continued)

*Primary Examiner* — Thienvu V Tran
*Assistant Examiner* — Sreeya Sreevatsa
(74) *Attorney, Agent, or Firm* — McCarter & English, LLP

(57) ABSTRACT

A device for door and phase segregation in low voltage circuit breakers, in particular in molded case circuit breakers, having a plurality of phases each provided with a lug for electrical connection of said circuit breaker and a venting aperture for venting off gases, the device comprising a conductive element adapted to be fixed to a corresponding lug of the circuit breaker and provided with electrical connection means for electrical connection of the circuit breaker, comprising a first insulating element covering the conductive element and/or a second insulating element adapted to be interposed between two adjacent phases of the circuit breaker.

16 Claims, 11 Drawing Sheets

(51) Int. Cl.
*H01H 71/74* (2006.01)
*H01H 77/00* (2006.01)

(58) Field of Classification Search
CPC .......... H01H 2071/006; H01H 9/0072; H01H 9/342; H01H 9/0264; H01H 73/18
USPC .......................................................... 200/302.1
See application file for complete search history.

(56) References Cited

U.S. PATENT DOCUMENTS

| | | | | |
|---|---|---|---|---|
| 6,407,354 | B1 * | 6/2002 | Turner | H01H 9/342 218/155 |
| 2002/0144978 | A1 | 10/2002 | Leone et al. | |
| 2008/0074217 | A1 * | 3/2008 | Duchrow | H01H 9/342 335/202 |
| 2008/0089049 | A1 * | 4/2008 | Besana | H01H 71/08 361/823 |
| 2013/0146430 | A1 * | 6/2013 | Sisley | H01H 71/08 29/622 |

FOREIGN PATENT DOCUMENTS

| | | | |
|---|---|---|---|
| CN | 106469623 | A | 3/2017 |
| EP | 0683498 | A1 | 11/1995 |
| JP | 2002008508 | A | 1/2002 |
| JP | 2008204863 | A | 9/2008 |
| WO | 2006120150 | A1 | 11/2006 |

OTHER PUBLICATIONS

Chinese Office Action for Application No. 202010722837.2, dated Jul. 19, 2023, 8 pages.

United Arab Emirates Office Action for Application No. P6001118/2020, dated Nov. 25, 2024, 9 pages.

* cited by examiner

DEVICE FOR DOOR AND PHASE SEGREGATION IN MOLDED CASE CIRCUIT BREAKERS

The present invention relates to a device for door and phase segregation in low voltage circuit breakers, in particular in molded case circuit breakers.

It is known that switching devices, such as for example circuit breakers, disconnectors, contactors, limiters, hereinafter referred to as switches, for reasons of brevity, generally comprise a casing and a plurality of electrical poles, associated to each of which there is at least one pair of contacts that can be coupled to and uncoupled from one another. Switches of the known art also comprise control means that cause relative movement of said pairs of contacts so that they can assume at least one first, coupling, position (circuit closed) and one second, separation, position (circuit open).

As known, during the useful life of a low voltage switch, phenomena which expose the switch and the network to particularly heavy stresses can occur. This happens in the first place when the switch is required to withstand, even for short periods, currents greater than the rated values.

Thus, in general, in low voltage circuit breakers, the critical function of interrupting the current (whether nominal, overload or short-circuit current) is provided in a specific portion of the circuit breaker which is constituted by the so-called deionizing arc chamber.

Generally associated to each pole of the switch there is therefore at least one arc chamber, i.e., a region of space which is particularly suited to fostering electric-arc interruption. Arc chambers can be simple regions provided in the casing of the switch, or else can comprise various modular elements shaped, for example, like casings made of insulating material equipped with arc-breaking plates. Modular arc chambers, which are more advanced, present the advantage of being easily replaceable; moreover they can also be manufactured using materials that are more suitable as compared, for example, to the ones used for the casing of the switch.

Under operating conditions, as a consequence of the opening movement, the voltage between the contacts causes the dielectric discharge of the air, leading to the formation of the electric arc in the chamber. The arc is propelled by electromagnetic and fluid-dynamics effects inside a series of arc-breaking metal plates arranged in the chamber, which are meant to extinguish said arc by cooling and splitting actions.

During arc formation, the energy released by Joule effect is very high and causes thermal and mechanical stresses inside the plate containment region. It is worth noting that, depending on the kind of switch and the arching phenomenon that takes place, the pressure in the contact zone, and in particular in the arc chamber, can reach very high values, e.g. as high as 30-40 bars, while the temperature of the ionized gases can reach values of 3000-4000° K.

It is therefore necessary that the arc chamber is provided with an adequate system for venting off and cooling the hot gases that develop during arching. To this purpose, the existing arc chambers for low voltage switching devices are generally provided with openings for the discharge of the hot gases produced during arching and with a filtering system which, among others, has the functions of cooling the gas, reducing the velocity of the flow at the discharge, preventing the emission of flame and/or incandescent gases.

However, depending on the application and the type of interventions, the ionized gas vented off through the venting openings may create discharge problems between adjacent phases and between each phase and the front door of the panel into which the circuit breaker is normally positioned.

The main aim of the present invention is to provide a low voltage circuit breaker, in particular a molded case circuit breaker, provided with a system that allows solving or at least reducing the above-mentioned problems.

It is therefore an object of the present invention to provide a device able to guarantee an effective segregation between the various phases of a low voltage circuit breaker when ionized gases are vented off the arching chamber of each pole.

It is a further object of the present invention to provide a device able to guarantee an effective segregation between each phases of a low voltage circuit breaker and the front door of the panel into which the circuit breaker is positioned when ionized gases are vented off the arching chamber of each pole.

Still another object of the present invention is to provide a device able to guarantee an effective door and phase segregation in low voltage circuit breakers, in particular in molded case circuit breakers, that can be easily manufactured at industrial level, at competitive costs with respect to the solutions of the state of the art.

A low voltage circuit breaker, in particular a molded case circuit breaker, provided with a reliable door and phase segregation device is also an object of the present invention.

In order to fulfill these objects, the present invention provides a device for door and phase segregation in low voltage circuit breakers, in particular in molded case circuit breakers, having a plurality of phases each provided with a lug for electrical connection of said circuit breaker and a venting aperture for venting off gases; the device of the invention comprises a conductive element adapted to be fixed to a corresponding lug of said circuit breaker and provided with electrical connection means for electrical connection of said circuit breaker. The device for door and phase segregation of the present invention is characterized in that it comprises a first insulating element covering said conductive element and/or a second insulating element adapted to be interposed between two adjacent phases of said circuit breaker In this way, it is possible to provide a low voltage circuit breaker, particularly a molded case circuit breaker, which is capable to withstand the negative effects brought about by the hot ionized gases coming from the arc chamber.

In practice, as better explained hereinafter, in the system of the present invention the first and the second insulating elements are able to create an effective segregation between the various phases and between each phase and the front door of the panel, thereby solving, or at least greatly reducing, the problems of the prior art systems.

For the purposes of the present invention, in the description the terms "vertical", "horizontal", "front", "rear", "lateral", "top" and "bottom" refers to the typical operating configuration of the circuit breaker.

In a largely preferred embodiment of the device for door and phase segregation of the present invention, the conductive element is substantially L-shaped. In turn, the first insulating element comprises a first insulating body which is also substantially L-shaped and which is fitted onto said conductive element. In particular, the first insulating element has a first and a second lateral surface which are substantially continuous and substantially L-shaped, and a top surface which is conveniently provided with an opening for accessing the connection means of said conductive element.

Preferably, said first insulating body has a rear and a bottom surface which are also provided with openings allowing the passage of said conductive element, so that the first insulating body can be slidingly inserted onto said conductive element and covers it completely on the front and lateral sides, thereby creating an effective insulation of said conductive element.

Typically, in an embodiment of the device for door and phase segregation presently disclosed, the conductive element is provided with first fixing means for the mechanical connection to a corresponding lug of said circuit breaker; the conductive element can be also provided with second fixing means for mechanical connection of said electrical connection means.

As better explained hereinafter, in this case, the first insulating body can be advantageously shaped with a front surface having a first portion and a second portion raised with respect to said first portion. One or more openings can be advantageously positioned on said first and/or second portion for accessing said first and/or second fixing means, thereby making very easy the installation of the device on the circuit breaker and the connection of this latter to the electrical circuit into which it is positioned.

For example, said first and second fixing means can be screw means adapted to effectively fix the conductive element to the terminals of the circuit breaker and to conductors (e.g., cables or bars) of the electrical circuit.

In an embodiment of the device for door and phase segregation of the present invention, said first insulating body is conveniently provided with an elongated protrusion substantially perpendicular to said first and second lateral surface and vertically extending along at least a portion of said first and second lateral surface.

In this way, the elongated protrusion form a sort of screen, thereby channeling them away from the more sensitive parts of the circuit breaker.

Moreover, in a particular embodiment of the device for door and phase segregation presently disclosed, the first insulating body can be advantageously provided with a tab which is adapted to rest on a surface of said circuit breaker proximate to a venting aperture of said circuit breaker, on a front side thereof. In this way the hot ionized gases can be prevented to flow toward the front door of the panel into which the circuit breaker is inserted.

For instance, said tab can be conveniently positioned in an intermediate position between said first and second portions of the front surface of the first insulating body.

In a further largely preferred embodiment of the device for door and phase segregation of the present invention, said second insulating element advantageously comprises an insulating fin vertically extending between two adjacent phases of said circuit breaker.

Moreover, said insulating fin is shaped so as to have a third and a fourth substantially continuous lateral surfaces and is conveniently provided with a third and a fourth lateral protrusions which are substantially perpendicular to said third and fourth lateral surfaces and which run vertically along at least a portion of said third and fourth lateral surfaces.

In practice, according to this embodiment, the main body of the insulating fin provides an effective segregation between the various phases, while the third and fourth lateral protrusions provide an effective contribution to the segregation between the each phase and the front door of the panel.

In this respect, in an embodiment of the device for door and phase segregation in low voltage circuit breakers of the present invention, said third and fourth lateral protrusions of the insulating fin are adapted to rest on a surface of said circuit breaker proximate to a venting aperture of said circuit breaker, thereby providing an effective screen for the hot ionized gases coming from the arc chamber.

A low voltage circuit breaker, in particular a molded case circuit breaker comprising a device for door and phase segregation as disclosed herein is also part of the present invention.

Further features and advantages of the invention will emerge from the description of preferred, but not exclusive embodiments of the device for door and phase segregation, according to the invention, non-limiting examples of which are provided in the attached drawings, wherein:

FIG. 1 is a perspective view of an embodiment of a molded case circuit breaker;

FIGS. 2*a*-2*c* are perspective views of an embodiment of a device for door and phase segregation for low voltage circuit breakers, according to the invention;

FIGS. 3*a*-3*b* are perspective views of an embodiment of a conductive element in a device for door and phase segregation for low voltage circuit breakers, according to the invention;

FIGS. 4*a*-4*b* are perspective views of an embodiment of a first insulating element in a device for door and phase segregation for low voltage circuit breakers, according to the invention;

FIG. 5 is a perspective view of a first embodiment of a molded case circuit breaker equipped with a device for door and phase segregation, according to the invention;

FIGS. 6*a*-6*c* are perspective views of an embodiment of a second insulating element in a device for door and phase segregation for low voltage circuit breakers, according to the invention;

Figure 1:
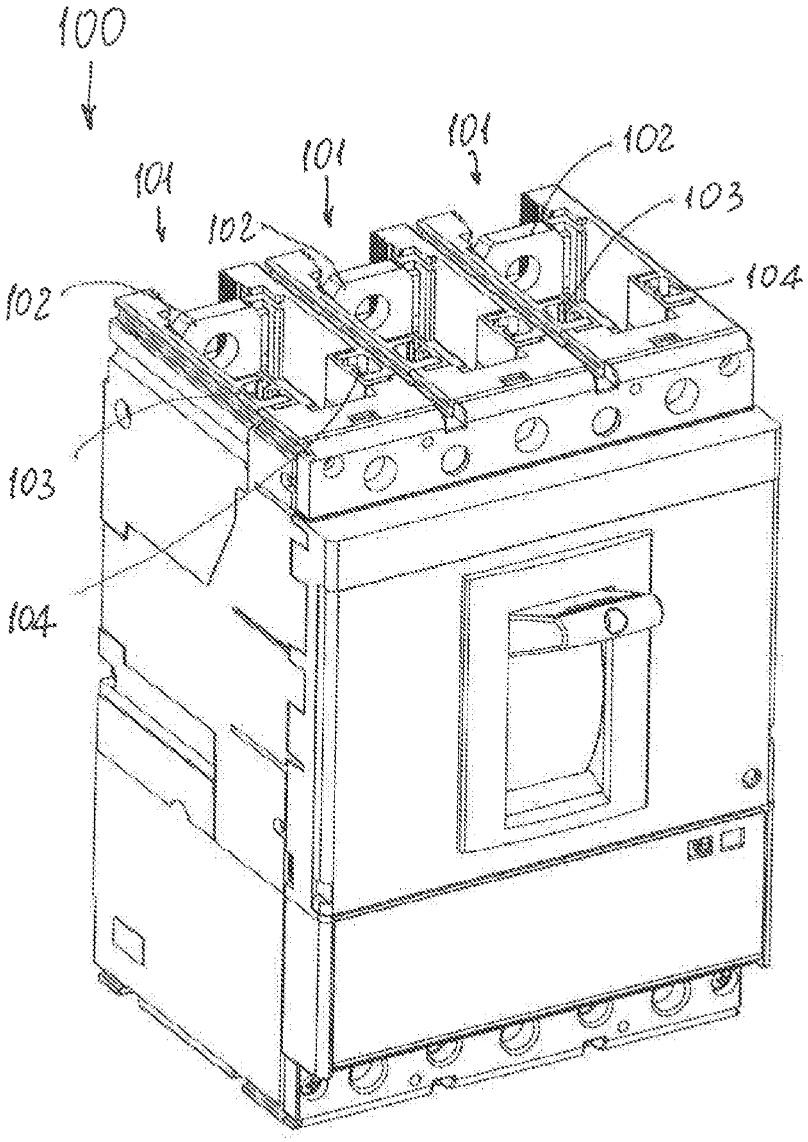

With reference to the attached Figures, the device for door and phase segregation according to the invention, is adapted to be used in low voltage circuit breakers, in particular in a molded case circuit breaker 100 as represented in FIG. 1.

The circuit breaker 100 has a plurality of phases 101, in the present case three phases, and associated to each of which there is at least a pair of contacts that can be coupled to and uncoupled from one another, thereby achieving a closed or open configuration. The circuit breaker also comprises control means that cause relative movement of said pairs of contacts so that they can assume a first, coupling, position (circuit closed) and a second, separation, position (circuit open). In general, the operating principles and functioning, as well as the related components and mechanisms, of the circuit breaker used in the present invention can be of the conventional type and will not be described in further details.

Each phase 101 of the circuit breaker 100 is also provided with one terminal 102 for the electrical connection of the circuit breaker 100 to a corresponding electrical circuit. On the top surface of the circuit breaker 100, in correspondence of each phase 101, there is usually positioned one or more venting apertures 103, 104 for venting off gases coming from the arc chamber.

In its more general definition, the device for door and phase segregation of the present invention comprises a conductive element 1 which is adapted to be fixed to a corresponding lug or terminal 102 of each phase 101 of the circuit breaker 100.

The conductive element 1 is normally provided with electrical connection means 11, 12 for electrical connection of said circuit breaker 100 to the corresponding electrical circuit. In the present case, the electrical connection means are represented by the seats (holes) 11, 12, into which the terminal portion of, e.g. a connection cable or—more in general—a connection element, can be inserted.

One of the distinguishing features of the device for door and phase segregation of the present invention, is given by the fact that that it comprises a first insulating element 2 which covers said conductive element 1 and/or a second insulating element 3 which is adapted to be interposed between two adjacent phases 101 of said circuit breaker 100.

More in details, with reference to FIGS. 2*a*-2*c* and 3*a*-3*b*, the conductive element 1 is substantially L-shaped. In turn, with reference also to FIGS. 4*a*-4*b*, the first insulating element 2 comprises a first insulating body 21 which is also substantially L-shaped so as to match the shape of the conductive element 1.

Figures 2A, 2B, 2C:
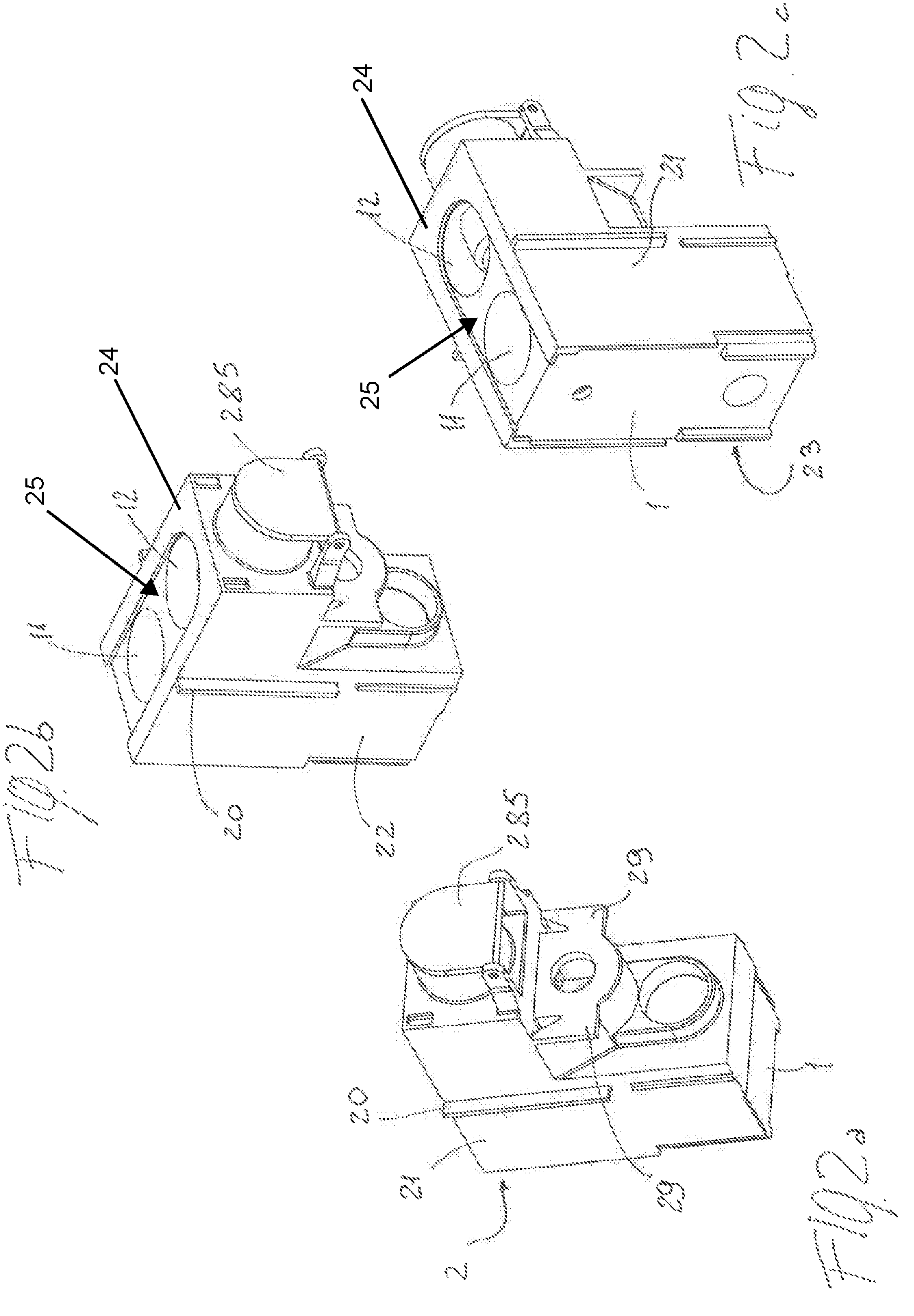

As shown in FIGS. 2*a*-2*c*, the first insulating body 21 is fitted onto the conductive element 1 and has a first 22 and a second 23 lateral surfaces which are substantially continuous and substantially L-shaped; the first insulating body 21 has also a top surface 24 which is provided with an opening 25 for accessing the connection means 11, 12, e.g. the seats 11, 12 of connection cables, of the conductive element 1.

Figure 4B:
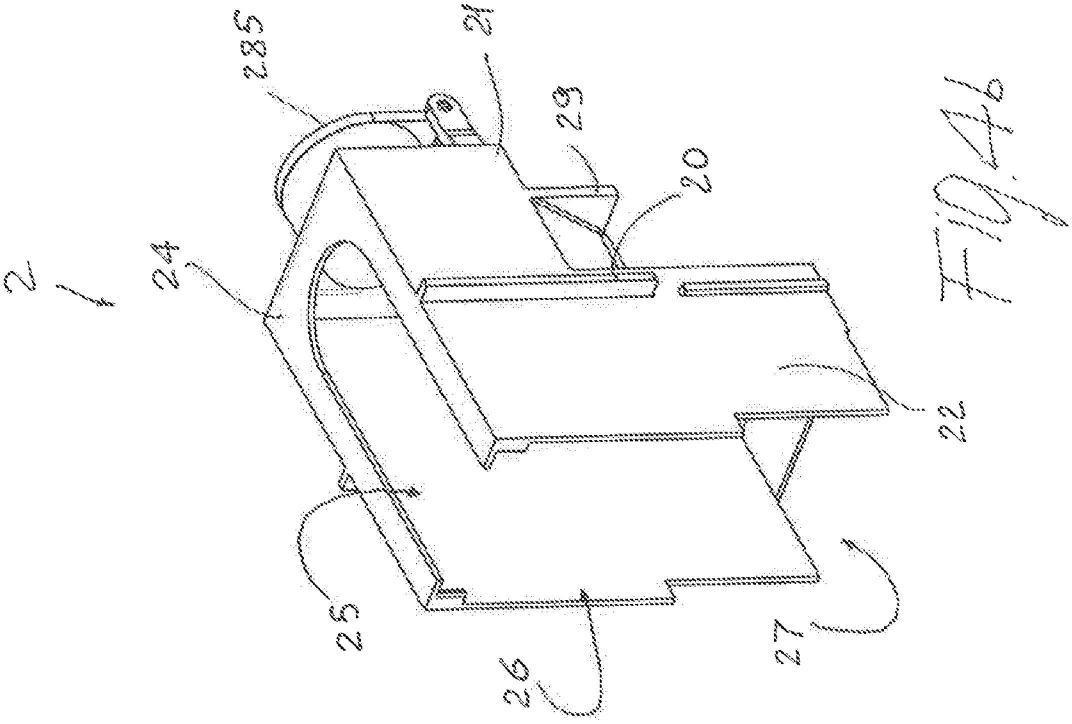
Figure 4A:
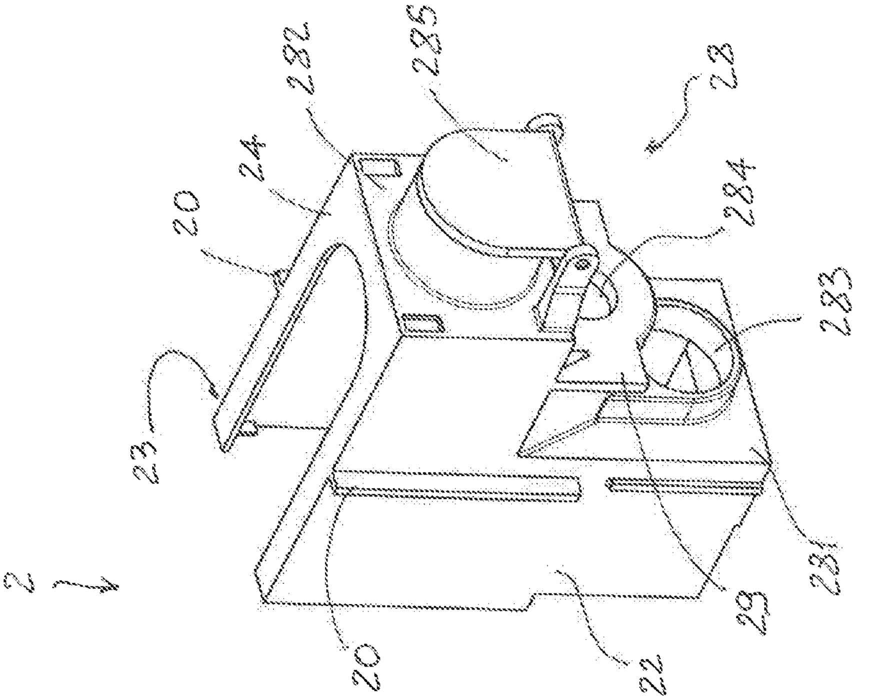

Moreover, as shown in particular in FIGS. 4*a*-4*b*, the first insulating body 21 has a rear surface 26 and a bottom surface 27, which are provided with openings allowing the passage of said conductive element 1. In the embodiments shown, the rear surface 26 of the first insulating body 21 is substantially completely open.

In this way, the first insulating body 21 can be inserted over the conductive element 1 with a sliding action, thereby achieving the configuration of FIGS. 2*a*-2*c*, and can be kept in place by small portions of the rear surface 26 and bottom surface 27.

Figure 3B:
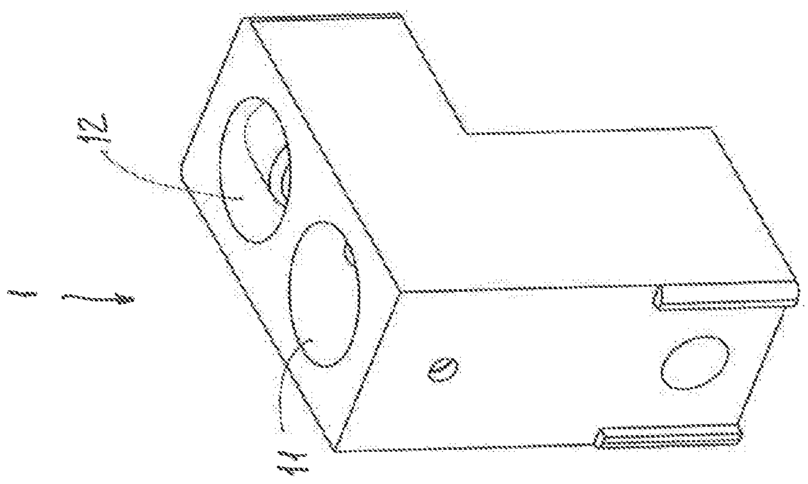
Figure 3A:
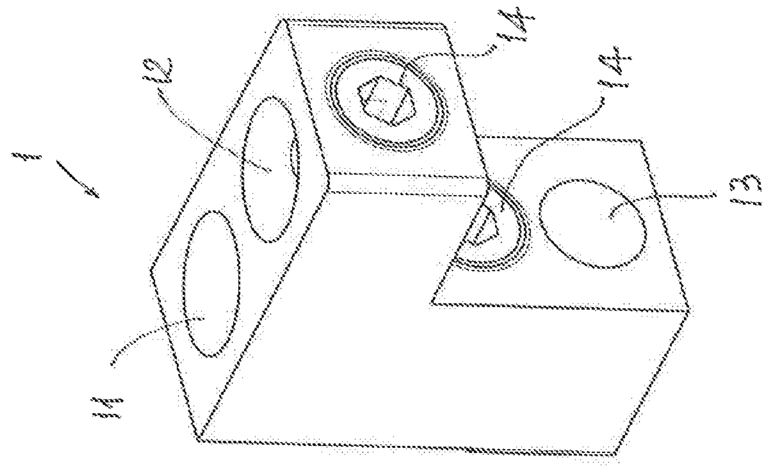

With reference to FIG. 3*a*-3*b*, the conductive element 1 is conveniently provided with first fixing means 13 for mechanical connection to a corresponding lug/terminal 102 of the circuit breaker 100 and second fixing means 14 for the mechanical connection of said electrical connection means, e.g. the terminal portion of one or more connection cables.

As shown in particular in FIGS. 4*a*-4*b*, the first insulating body 21 has a front surface 28 which is shaped so as to match the shape of the conductive element 1. In particular, the front surface 28 has a first portion 281 and a second portion 282 which is raised with respect to said first portion 281, so as to follow the L-shape of the conductive element 1. One or more openings 283, 284 are conveniently positioned on the first portion 281 and/or on the second portion 282 of the front surface 28 for accessing the first 13 and/or second 14 fixing means positioned on the conductive element 1.

In the embodiment shown, since there are foreseen two connection cables housed in the seats 11 and 12 (and therefore there are also two corresponding fixing means 14), a third hole is positioned on the second portion 282 of the front surface 28 of the first insulating body 21, said third hole being closed by a cover 285 in the embodiment shown in the attached figure.

For example, the first 13 and second 14 fixing means can be screw means, that are easily accessible through the openings 283 and 284 (as well as through the opening closed by the cover 285) and can therefore be easily operated to fix the device to the circuit breaker 100 and to fix the cable terminals to the conductive element 1.

With reference to FIGS. 2*a*-2*c* and 4*a*-4*b*, in a particular embodiment of the device for door and phase segregation of the invention, the first insulating body 21 is provided on both sides thereof with an elongated protrusion 20 which is substantially perpendicular to the first 22 and second 23 lateral surface the first insulating body 21. The elongated protrusions 20 extend vertically along at least a portion of the first 22 and second 23 lateral surface of the first insulating body 21.

Figure 5:
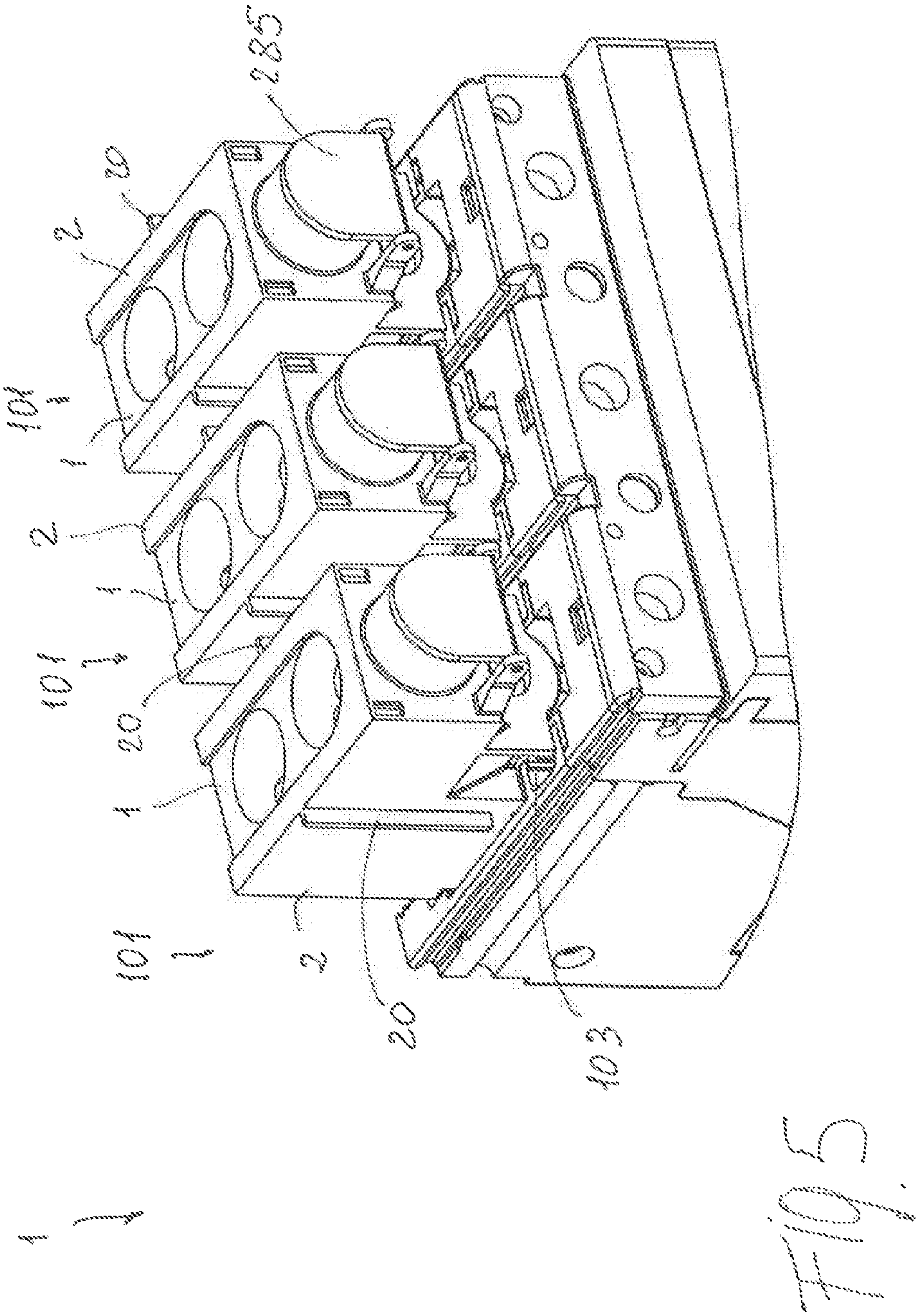

Thus, as shown in FIG. 5, the first 22 and second 23 lateral surface of the first insulating body 21 create a screen for the passage of the hot gases coming out from the venting aperture 103, 104 toward the rear portion of the circuit breaker 100.

Moreover, with reference to FIGS. 2*a*-2*c* and 4*a*-4*b*, the first insulating body 21 can be conveniently provided with a tab 29 which is adapted to rest on a surface of said circuit breaker 100 proximate to a venting aperture 103, 104 of said circuit breaker 100. In particular, said tab 29 can be conveniently positioned in an intermediate position between said first 281 and second 282 portions of the front surface 28 of the first insulating body 21.

In this way, as shown in FIG. 5, the tab 29 of the first insulating body 21 creates a screen for the passage of the hot gases coming out from the venting aperture 103, 104 toward the front portion of the circuit breaker 100, thereby effectively segregating each phase 101 from the front door of the panel.

With reference to FIGS. 6*a*-*c* to 8, in an embodiment of the device for door and phase segregation of the present invention, the second insulating element 3 typically comprises an insulating fin 31 which extends vertically between two adjacent phases 101 of said circuit breaker 100.

Figure 7:
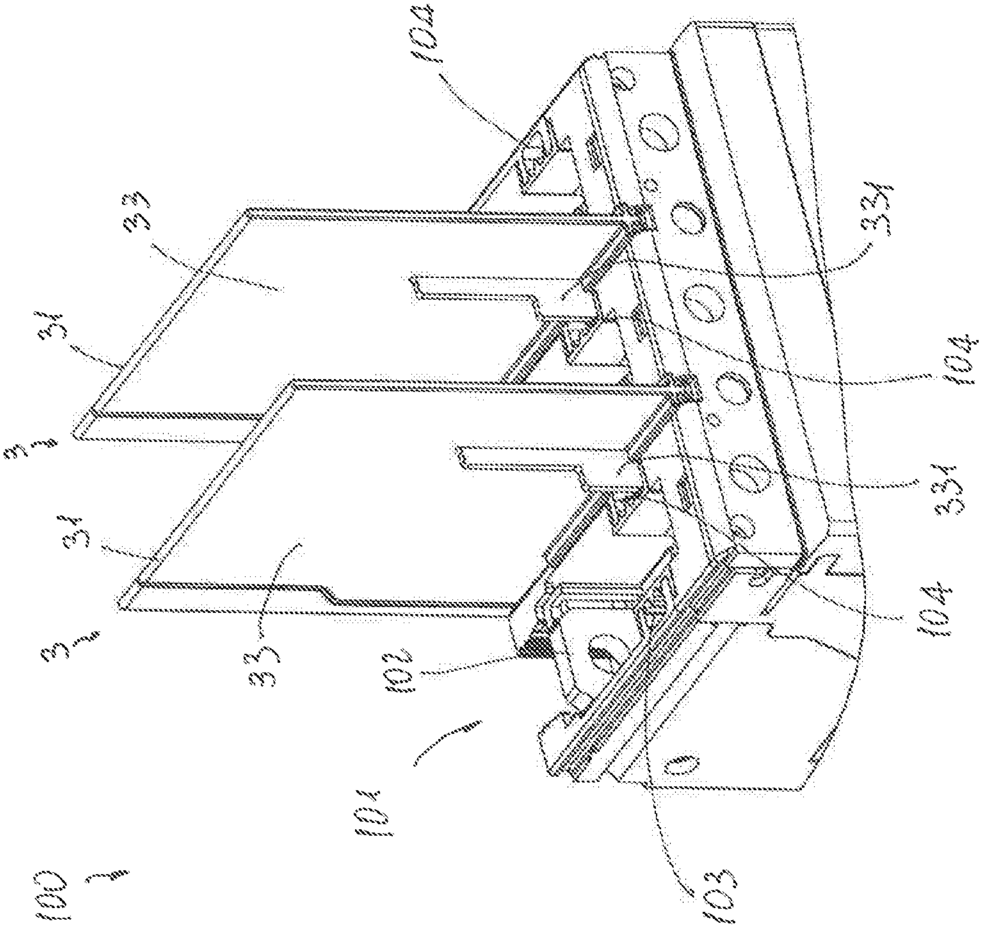
FIG. 7 is a partial perspective view of a second embodiment of a molded case circuit breaker equipped with a device for door and phase segregation, according to the invention.
Figure 8:
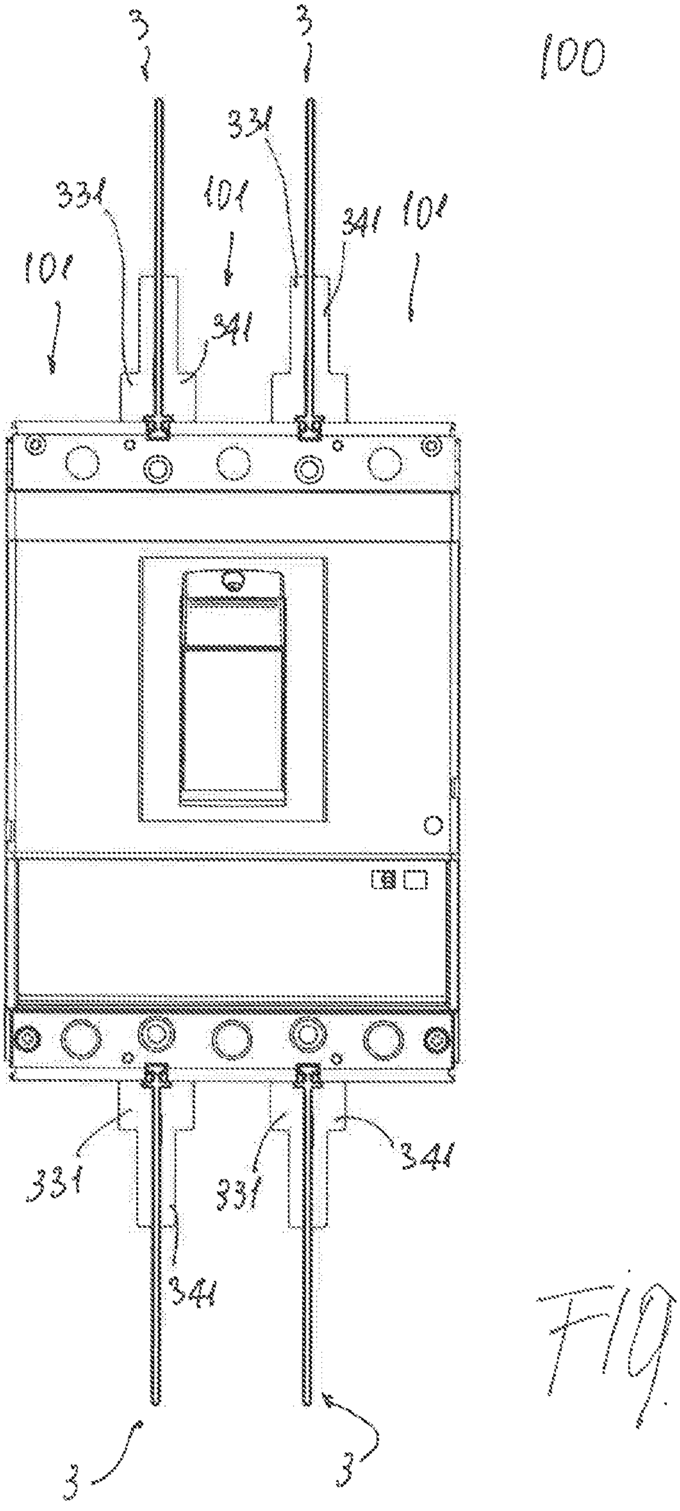
FIG. 8 is a front view of the molded case circuit breaker of FIG. 7.

As shown in FIGS. 7 and 8, the insulating fin 31 is therefore able to effectively segregate the various phases 101 form each other. In practice, the insulating fin 31 can be easily inserted between the phases 101 with a simple sliding action. To this purpose, the base of the insulating fin 31 can be conveniently shaped so as to match the shape of a guide positioned on the circuit breaker 100 between the various phases 101. Other fixing or insertion means can however be used depending on the needs.

Figure 6C:
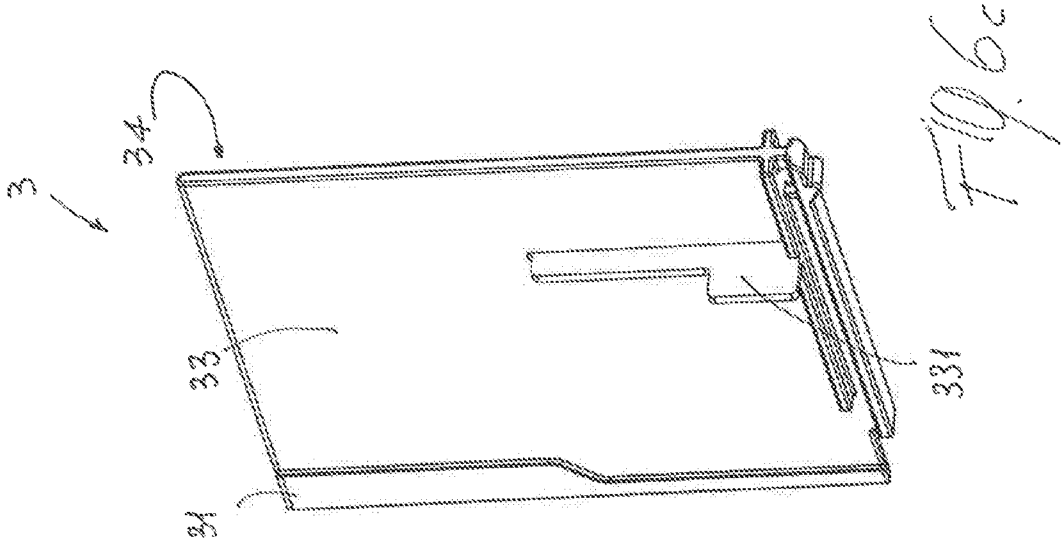
Figure 6B:
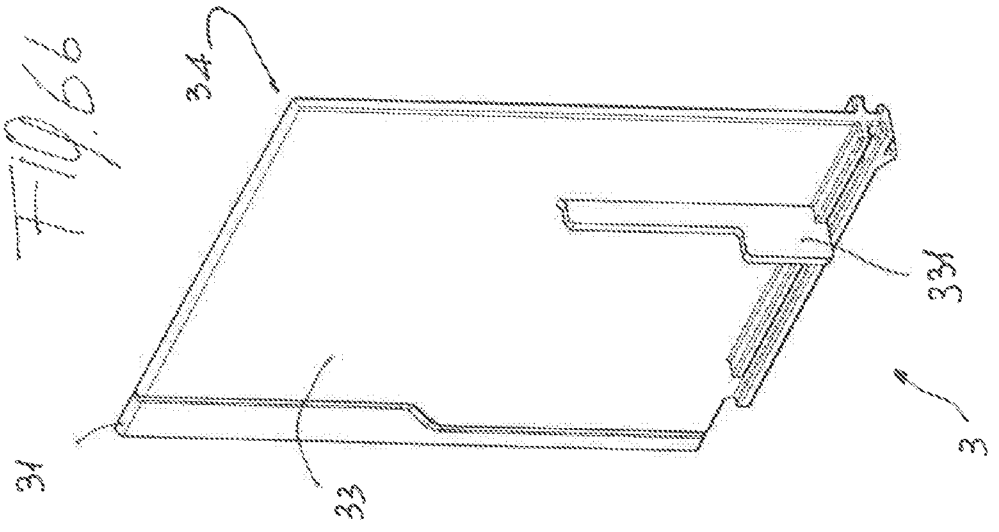
Figure 6A:
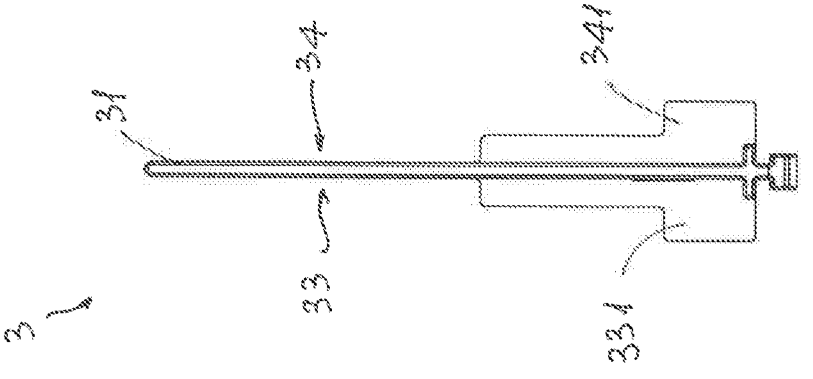

More in details, with reference to FIGS. 6*a*-6*c*, said insulating fin 31 is shaped so as to have a third 33 and a fourth 34 substantially continuous lateral surfaces. The insulating fin 31 is provided on both sides thereof with a third 331 and a fourth 341 lateral protrusions which are substantially perpendicular to the third 33 and fourth 34 lateral surfaces of the insulating fin 31. The third 331 and a fourth 341 lateral protrusions run vertically along at least a portion of said third 33 and fourth 34 lateral surfaces of the insulating fin 31.

As shown in FIGS. 7 and 8, said third 331 and fourth 341 lateral protrusions are adapted to rest on a surface of said circuit breaker 100 proximate to a venting aperture 103, 104 of said circuit breaker 100. Shape and dimensions of the third 331 and fourth 341 lateral protrusions can be any according to the needs.

In this way, as shown in FIGS. 7 and 8, the third 331 and fourth 341 lateral protrusions of the insulating fin 31 creates a screen for the passage of the hot gases coming out from the venting aperture 103, 104 toward the front portion of the circuit breaker 100, thereby effectively segregating each phase 101 from the front door of the panel.

It is clear from the above that the device for door and phase segregation in low voltage circuit breakers of the present invention allows solving the previously underlined technical problems. Indeed, it has been seen that a device for door and phase segregation according to the present invention, thanks to its structure, is able to effectively segregate the various phases among each other and also with respect to the front.

As shown in FIG. 5, an effective segregation can be carried out by using the first insulating element 2 alone, while, as shown in FIGS. 7 and 8, an effective segregation can be also carried out by using the second insulating element 3 alone.

Figure 9:
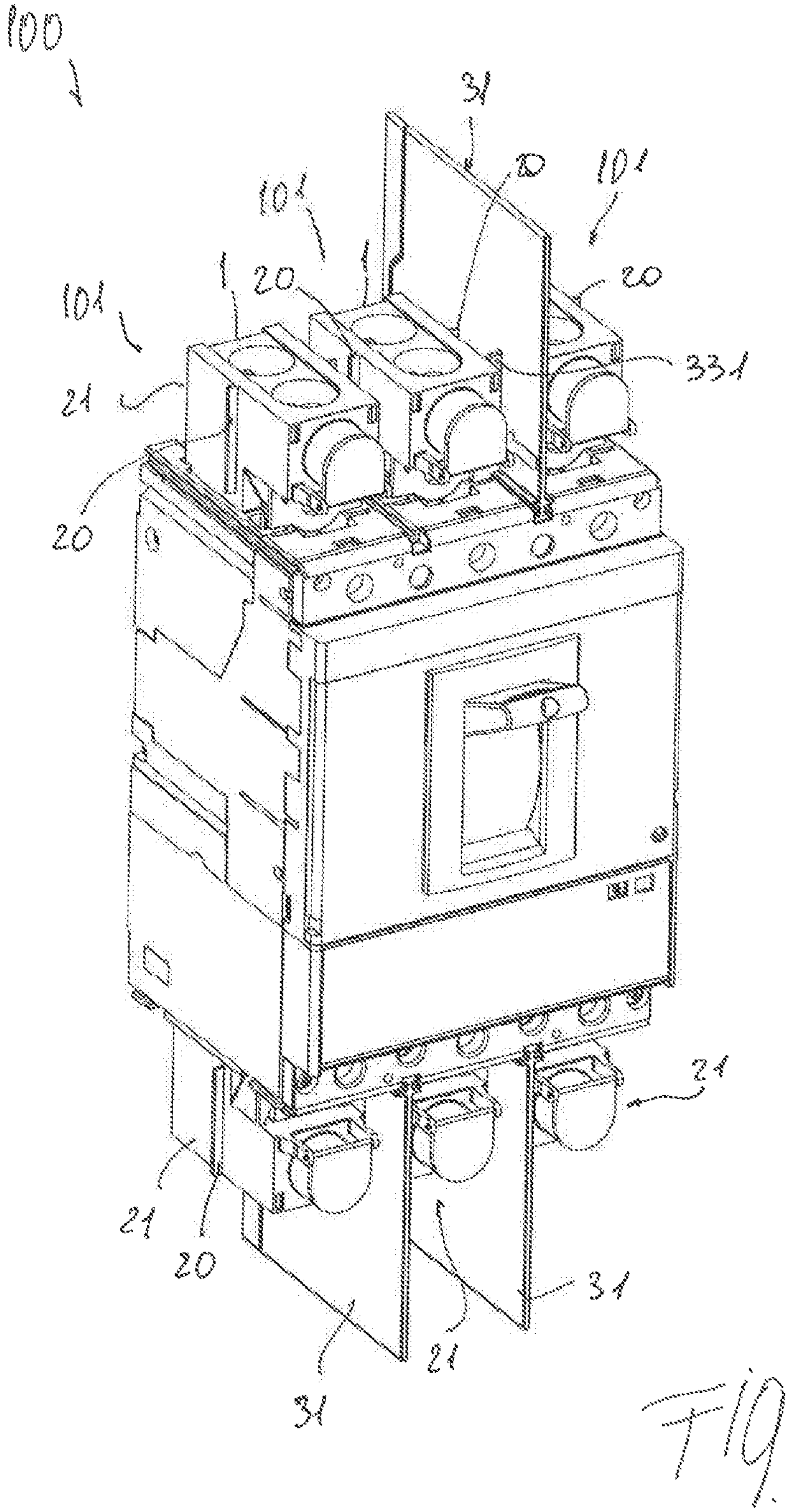
FIG. 9 is a perspective view of a third embodiment of a molded case circuit breaker equipped with a device for door and phase segregation, according to the invention.
Figure 10:
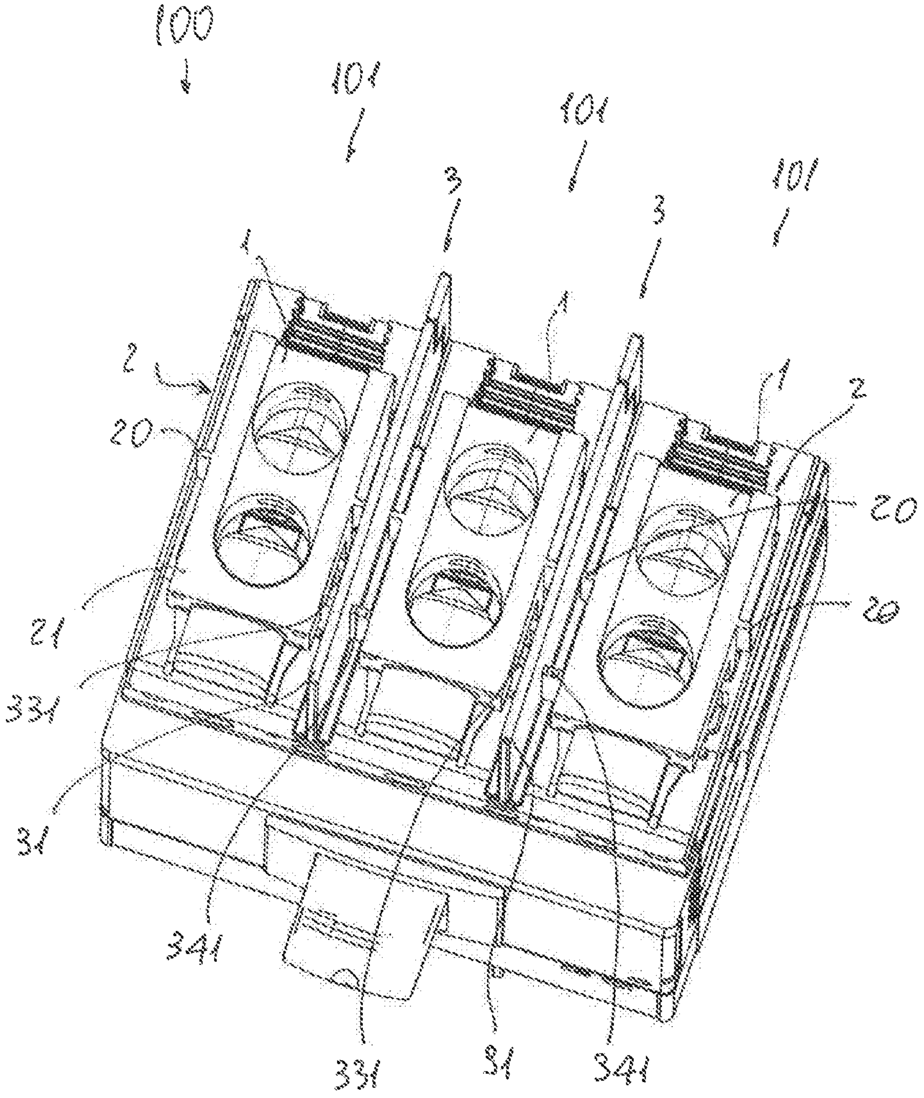
FIG. 10 is a top view of the molded case circuit breaker of FIG. 9.
Figure 11:
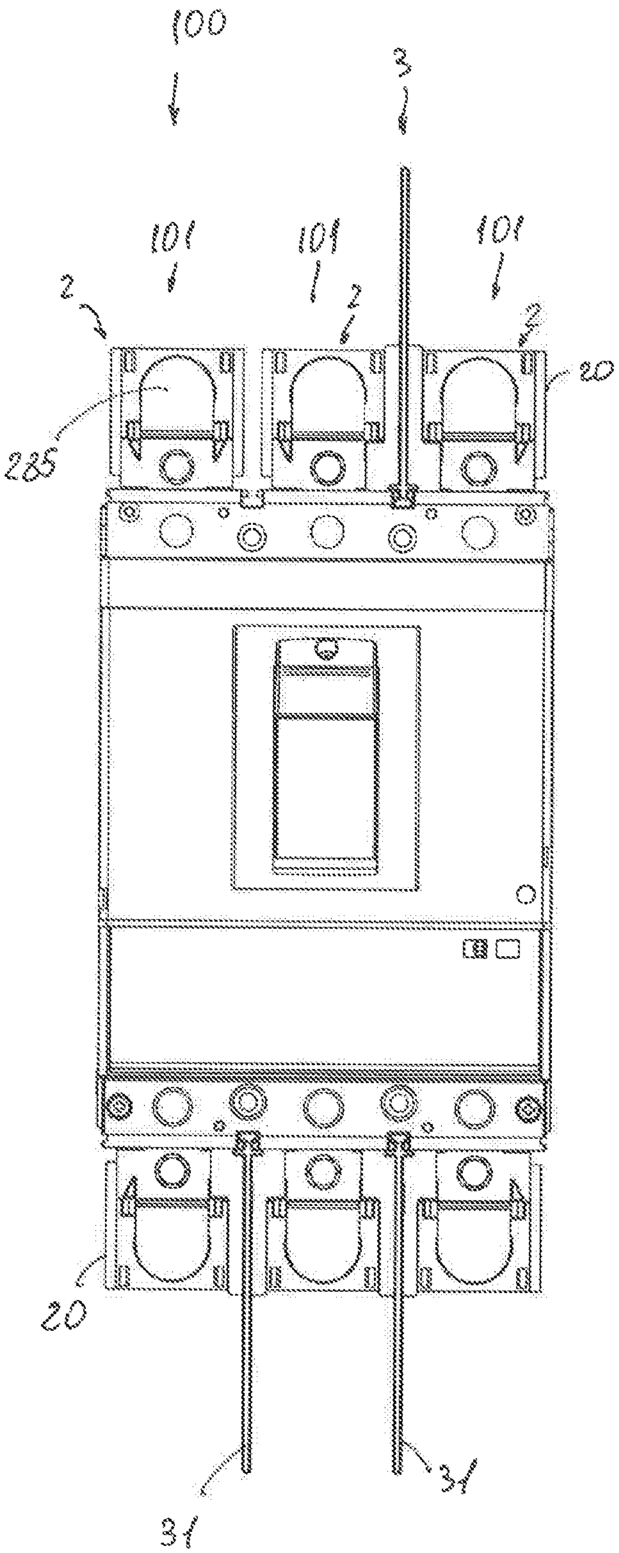
FIG. 11 is a front view of the molded case circuit breaker of FIG. 9.

However, very effective results can be obtained by combining the two embodiments, i.e. by using both the first insulating element 2 and the second insulating element 3, as shown in FIGS. 9-11. Several variations can be made to the device for door and phase segregation for low voltage circuit breakers, and to the low voltage circuit breakers, in particular molded case circuit breakers, thus conceived, all falling within the scope of the attached claims. In practice, the materials used and the contingent dimensions and shapes can be any, according to requirements and to the state of the art.

The invention claimed is:

1. A device for door and phase segregation in a molded case circuit breaker, the molded case circuit breaker having a plurality of phases each provided with a corresponding lug for an electrical connection to the molded case circuit breaker and a venting aperture for venting off gases, the device comprising:

a conductive element adapted to be removably attached to the corresponding lug of the molded case circuit breaker, wherein the conductive element includes an electrical connection mechanism for the electrical connection to the molded case circuit breaker, and wherein the conductive element is substantially L-shaped, the conductive element having a first side and a second side substantially L-shaped;

a first insulating element comprising a first lateral surface, a second lateral surface, and a top surface connecting the first lateral surface and the second lateral surface, the first lateral surface, the second lateral surface, and the top surface defining a cavity, the first insulating element receiving the conductive element in the cavity and covering the conductive element by the first lateral surface, the second lateral surface, and the top surface, wherein the first insulating element comprises a first insulating body substantially L-shaped that is fitted onto the conductive element and matches a shape of the conductive element, and the first lateral surface and the second lateral surface substantially continuous and substantially L-shaped, the first lateral surface and the second lateral surface covering the first side and the second side of the conductive element and matching shapes of the first side and the second side, the top surface provided with an opening for accessing the electrical connection mechanism of the conductive element; and a second insulating element adapted to be interposed between two adjacent phases of the molded case circuit breaker, wherein the second insulating element comprises a fin extending between the two adjacent phases of the molded case circuit breaker, and wherein the fin includes a third lateral protrusion and a fourth lateral protrusion that extend substantially perpendicularly from a third surface and a fourth surface, respectively, of the fin.

2. The device for door and phase segregation in the molded case circuit breaker according to claim 1, wherein the first insulating body has a rear and a bottom surface provided with openings allowing a passage of the conductive element, the first insulating body being slidingly insertable onto the conductive element.

3. The device for door and phase segregation in the molded case circuit breaker according to claim 2, wherein the conductive element is provided with a first fixing mechanism for mechanical connection to the corresponding lug of the molded case circuit breaker and a second fixing mechanism for mechanical connection of the electrical connection mechanism, and in that the first insulating body has a front surface having a first portion and a second portion raised with respect to the first portion, one or more openings being positioned on the first portion and/or the second portion for accessing the first fixing mechanism and/or the second fixing mechanism.

4. The device for door and phase segregation in the molded case circuit breaker according to claim 3, wherein the first and second fixing mechanisms are screws.

5. The device for door and phase segregation in the molded case circuit breaker according to claim 3, wherein the first insulating body is provided with an elongated protrusion substantially perpendicular to the first and second lateral surface and vertically extending along at least a portion of the first and second lateral surface.

6. The device for door and phase segregation in the molded case circuit breaker according to claim 5, wherein the first insulating body is provided with a tab adapted to rest on a surface of the molded case circuit breaker that is proximate to the venting aperture of the molded case circuit breaker.

7. The device for door and phase segregation in the molded case circuit breaker according to claim 6, wherein the tab is positioned in an intermediate position between the first and second portions of the front surface.

8. The device for door and phase segregation in the molded case circuit breaker according to claim 3, wherein a tab is positioned in an intermediate position between the first and second portions of the front surface.

9. The device for door and phase segregation in the molded case circuit breaker according to claim 1, wherein the fin extends vertically between the two adjacent phases of the molded case circuit breaker.

10. The device for door and phase segregation in the molded case circuit breaker according to claim 9, wherein the third and fourth surfaces are substantially continuous lateral surfaces, and wherein the third and fourth lateral protrusions vertically extend along at least a portion of the third and fourth surfaces.

11. The device for door and phase segregation in the molded case circuit breaker according to claim 10, wherein the third and fourth lateral protrusions are adapted to rest on a surface of the molded case circuit breaker that is proximate to the venting aperture of the molded case circuit breaker.

12. The device for door and phase segregation in the molded case circuit breaker according to claim 1, wherein the conductive element is provided with a first fixing mechanism for mechanical connection to the corresponding lug of the molded case circuit breaker and a second fixing mechanism for mechanical connection of the electrical connection mechanism, and in that the first insulating body has a front surface having a first portion and a second portion raised with respect to the first portion, one or more openings being positioned on the first portion and/or the second portion for accessing the first fixing mechanism and/or the second fixing mechanism.

13. The device for door and phase segregation in the molded case circuit breaker according to claim 12, wherein the first and second fixing mechanism are screws.

14. The device for door and phase segregation in the molded case circuit breaker according to claim 13, wherein the first insulating body is provided with a tab adapted to rest on a surface of the molded case circuit breaker that is proximate to the venting aperture of the molded case circuit breaker.

15. The device for door and phase segregation in the molded case circuit breaker according to claim 14, wherein the tab is positioned in an intermediate position between the first and second portions of the front surface.

16. The device for door and phase segregation in the molded case circuit breaker according to claim 1, wherein the first and second lateral surface of the first insulating element completely cover the first and second sides of the conductive element.

* * * * *